(12) United States Patent
Ware et al.

(10) Patent No.: US 10,840,974 B1
(45) Date of Patent: Nov. 17, 2020

(54) TRANSMITTER/RECEIVER WITH SMALL-SWING LEVEL-SHIFTED OUTPUT

(71) Applicant: Rambus Inc., Sunnyvale, CA (US)

(72) Inventors: Frederick A. Ware, Los Altos Hills, CA (US); Carl W. Werner, Los Gatos, CA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 16/371,504

(22) Filed: Apr. 1, 2019

Related U.S. Application Data

(60) Provisional application No. 62/654,136, filed on Apr. 6, 2018.

(51) Int. Cl.
 *H04B 3/56* (2006.01)
 *H04B 1/04* (2006.01)
 *H04L 25/02* (2006.01)

(52) U.S. Cl.
 CPC ............. *H04B 3/56* (2013.01); *H04B 1/04* (2013.01); *H04L 25/0264* (2013.01); *H04B 2001/0416* (2013.01)

(58) Field of Classification Search
 CPC ....... H03K 19/018528; H03K 3/35613; H03K 19/018521; H03K 19/20; H03K 19/0944; G11C 5/063; H04B 3/56; H04B 1/04; H04B 2001/0416; H04L 25/0264
 See application file for complete search history.

(56) References Cited

U.S. PATENT DOCUMENTS

| | | | |
|---|---|---|---|
| 4,761,567 A | 8/1988 | Walters, Jr. et al. | |
| 5,036,226 A * | 7/1991 | Tonnu | H03K 19/01852 326/71 |
| 5,093,245 A * | 3/1992 | Keith | C12Q 1/6813 435/35 |
| 5,134,316 A | 7/1992 | Ta | |
| 5,812,463 A * | 9/1998 | Park | G11C 16/12 365/185.23 |
| 5,822,573 A | 10/1998 | Saeki et al. | |
| 5,850,157 A | 12/1998 | Zhu et al. | |
| 5,856,752 A | 1/1999 | Arnold | |
| 6,040,707 A * | 3/2000 | Young | H03K 19/00361 326/21 |
| 6,087,881 A * | 7/2000 | Chan | H03K 19/00315 326/62 |
| 6,407,591 B1 | 6/2002 | Wong et al. | |

(Continued)

OTHER PUBLICATIONS

Ram K. Krishnamurthy et al, "Exploring the Design Space of Mixed Swing QuadRail for Low-Power Digital Circuits", IEEE Transactions on Very Large Scale Integration (VLSI) Systems, Dec. 1997, pp. 388-400, vol. 5, No. 4.

*Primary Examiner* — Sophia Vlahos
(74) *Attorney, Agent, or Firm* — Charles Shemwell (57) ABSTRACT

An integrated-circuit output driver generates, in response to an input signal constrained to a first voltage range, a control signal at one of two voltage levels according to a data bit conveyed in the input signal, the two voltages levels defining upper and lower levels of a second voltage range substantially larger than the first voltage range. The output driver generates an output-drive signal constrained to a third voltage range according to the one of the two voltage levels of the control signal, the third voltage range being substantially smaller than the second voltage range.

23 Claims, 7 Drawing Sheets

(56) References Cited

U.S. PATENT DOCUMENTS

| | | | |
|---|---|---|---|
| 6,424,190 B1 | 7/2002 | Kim | |
| 6,426,656 B1 | 7/2002 | Dally et al. | |
| 6,646,473 B1 | 11/2003 | Trivedi et al. | |
| 6,668,031 B1 | 12/2003 | Hanson et al. | |
| 6,717,448 B2 | 4/2004 | Heo et al. | |
| 6,965,299 B1 | 11/2005 | Dally et al. | |
| 7,071,736 B2 | 7/2006 | Wikstrom | |
| 7,948,270 B1 * | 5/2011 | Evans | H03K 5/003 |
| | | | 326/63 |
| 8,000,166 B2 | 8/2011 | Kim et al. | |
| 8,310,294 B2 | 11/2012 | Poulton et al. | |
| 8,947,149 B1 | 2/2015 | Kapoor et al. | |
| 9,203,411 B2 * | 12/2015 | Yu | H03K 19/0185 |
| 9,225,303 B1 * | 12/2015 | Nieland | H03F 3/303 |
| 10,388,355 B1 * | 8/2019 | Ware | G11C 5/063 |
| 10,447,270 B2 * | 10/2019 | Ware | H03K 19/20 |
| 2011/0018606 A1 * | 1/2011 | Cassia | H03K 3/35613 |
| | | | 327/333 |
| 2015/0349721 A1 * | 12/2015 | Samavedam | H03F 3/193 |
| | | | 330/253 |

* cited by examiner

FIG. 7
Non-terminated Link

FIG. 8
Series-Terminated Link

FIG. 9 Parallel-Terminated Link

FIG. 12  Execution units with multi-drop bus topology

TRANSMITTER/RECEIVER WITH SMALL-SWING LEVEL-SHIFTED OUTPUT

CROSS REFERENCE TO RELATED APPLICATIONS

This application hereby claims priority to and incorporates by reference U.S. provisional application No. 62/654,136 filed Apr. 6, 2018

TECHNICAL FIELD

The present disclosure relates to electrical signaling within or between integrated circuit devices.

DRAWINGS

The various embodiments disclosed herein are illustrated by way of example, and not by way of limitation, in the figures of the accompanying drawings and in which like reference numerals refer to similar elements and in which.

DETAILED DESCRIPTION

Signaling circuits that bridge distinct input and output signaling voltage domains to increase output drive current without added output impedance are disclosed in various embodiments herein. In a number of embodiments, the increased output drive current enables correspondingly increased output signaling rate (i.e., as signal line capacitance may be more rapidly charged and discharged) which, in turn, enables time-multiplexed (pipelined) transmission of data supplied at slower rates from two or more sources—a particularly beneficial approach in voltage-scaled cryogenic applications as the increased output signaling rate mitigates increased logic gate delay. In other embodiments, the increased output drive current is leveraged to increase output driver fan-out and/or increase receiver fan-in, permitting wider (more parallel) circuit interconnection architectures than possible with conventional signaling circuits.

Figure 1:
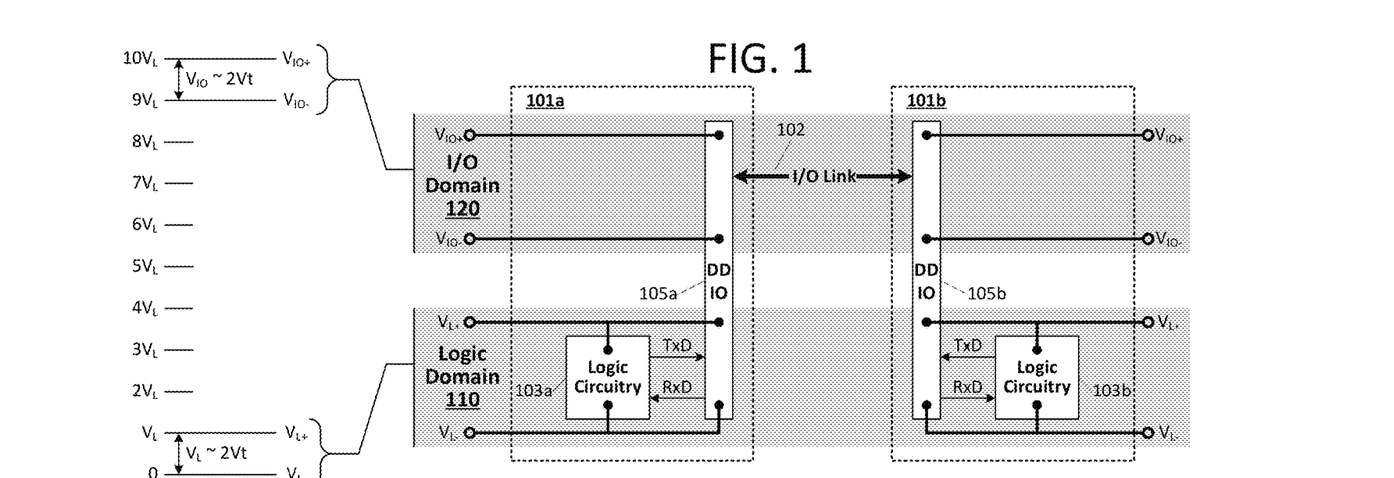
FIG. 1 illustrates an exemplary pair of dual-voltage domain circuit blocks interconnected by an input/output (I/O) signaling link.

FIG. 1 illustrates an exemplary pair of dual-voltage domain circuit blocks 101a, 101b interconnected by an input/output (I/O) signaling link 102. As shown, each circuit block (collectively "101") includes logic circuitry 103a, 103b powered by upper and lower logic supply voltages, $V_{L+}$ and $V_{L-}$, that define a logic voltage domain 110 (i.e., "logic domain") and a dual-domain I/O transceiver 105a, 105b that (i) outputs and receives signals via signaling link 102 at voltage levels, $V_{IO+}$ and $V_{IO-}$, of an I/O voltage domain 120 (the "I/O" domain), and (ii) exchanges transmit and receive data signals with the local logic circuitry 103a, 103b in the logic domain. In the particular embodiment shown, the lower logic supply voltage is referenced to zero volts (e.g., ground) and the logic voltage amplitude ($V_L = V_{L+} - V_{L-}$) is approximately twice the threshold voltage (Vt) of complementary metal oxide semiconductor (CMOS) transistors deployed within logic circuitry 103a, 103b and dual-domain IO circuits 105a, 105b. The I/O voltage supply has an amplitude ($V_{IO} = V_{IO+} - V_{IO-}$) nominally matched to the logic voltage amplitude, but is level shifted (offset in voltage) by roughly an order of magnitude (10×) relative to the logic voltage domain with $V_{IO+}$ set to approximately $10V_{L+}$. Higher or lower voltage-domain ratios (i.e., $V_{IO+}/V_{L+}$) may be implemented in alternative embodiments, (e.g., ratio of at least 2, 5 or 8, or higher than 10), and the voltage amplitude of either or both domains may be greater or less than 2Vt. Further, while each of the dual-domain I/O circuits (collectively 105) is depicted as a transceiver (i.e., having transmit circuitry and receive circuitry) to enable bidirectional signaling over I/O link 102, a unidirectional signaling arrangement may be implemented with a dual-domain transmitter in place of one I/O circuit and a dual-domain receiver in place of the other. Also, though not specifically shown, one or more other circuit blocks may be coupled to signaling link 102, each having its own dual-domain transceiver (or dual-domain transmitter or dual-domain receiver). Signaling link 102 itself may extend between two or more integrated circuit chips (e.g., conductor(s) within a cable, trace(s) routed over a circuit board substrate or wire-bonds/vias/other-conductive-interconnects between integrated circuit dies within the same package, etc.) or may be routed internally within an integrated circuit chip (e.g., interconnecting functional circuit blocks of the chip as in one or more metal layer conductors, doped polysilicon conductors or any other on-chip electrical interconnect). In either case, a single dual-domain voltage supply may deliver I/O domain and logic domain voltages to the circuit blocks 101 on either side of link 102, or respective/separate voltage generators may supply circuit blocks 101a and 101b the signaling link voltages. Additionally, voltage step-up and/or step-down circuitry may be provided within the integrated circuit(s) that host circuit blocks 101 to generate one voltage domain from the other, thus enabling such IC to be powered by a single pair of supply rails (e.g., $V_{DD}$ and ground).

Figure 2:
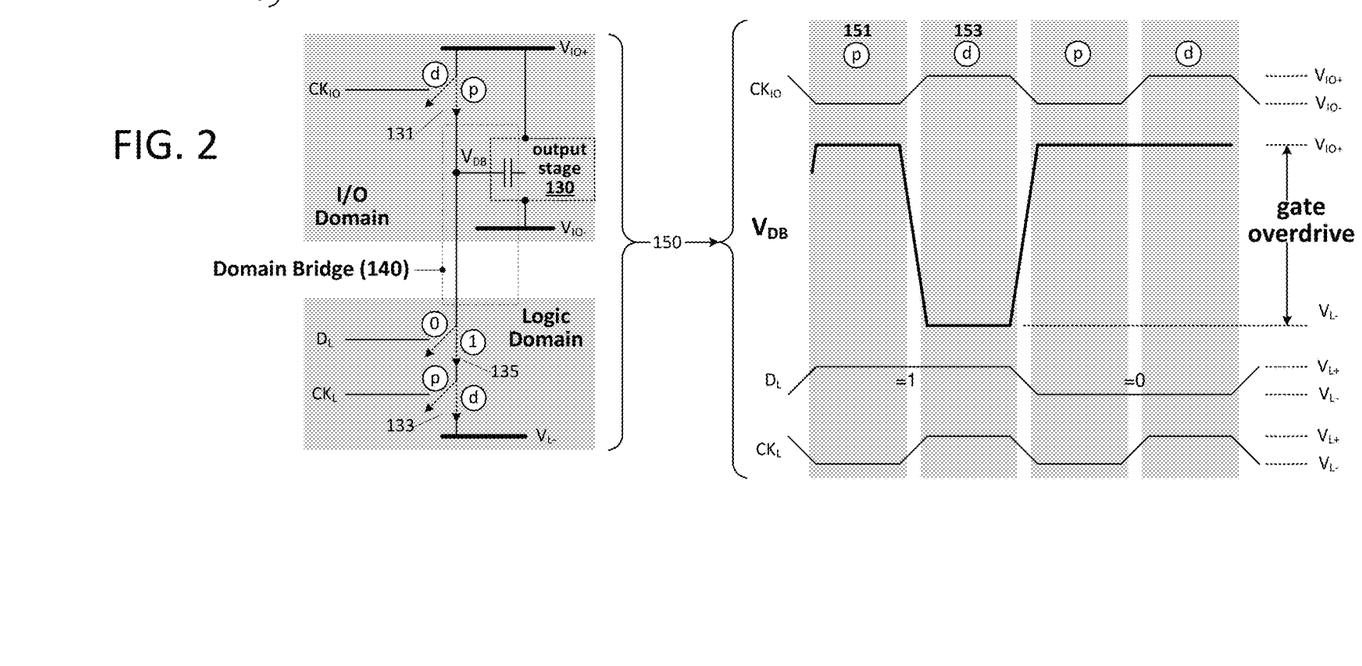
FIG. 2 illustrates exemplary bridging between logic-domain and I/O-domain components of the dual-domain I/O circuits of FIG. 1.

FIG. 2 illustrates exemplary bridging between logic-domain and I/O-domain components of the dual-domain I/O circuits 105 of FIG. 1—a domain bridging that produces an amplified gate-overdrive signal at an output stage 130 (modeled as a gate capacitance) of the I/O circuit. In the depicted implementation, logic domain and I/O domain clock signals $CK_L$ and $CK_{IO}$ (i.e., periodic signals that swing between the logic domain voltage rails and I/O domain voltage rails, respectively) are supplied to respective rail-isolation switch elements 131 and 133 (transistors), while a logic-domain data signal ($D_L$) is supplied to data switch element 135.

Switch elements 131, 133 and 135 are coupled in series between a the upper I/O-domain voltage rail ($V_{IO+}$) and lower logic-domain voltage rail ($V_{L-}$), with the interconnection between switch elements 131 and 135 coupled to one or more transistor gates within output stage 130 and constituting a bridging node 140 referred to herein as a domain bridge.

Referring to the exemplary timing diagram at 150, the I/O and logic clock signals ($CK_{IO}$ and $CK_L$, respectively) cycle between their respective domain voltage rails to define, during each clock cycle, a precharge interval 151 ($p$) followed by a drive interval 153 ($d$)—each during a respective half-clock cycle. During pre-charge interval 151, the low phase of $CK_{IO}$ (i.e., at voltage level $V_{IO-}$) closes switch element 131 to couple domain bridge 140 to the upper IO domain rail ($V_{IO+}$), while the low phase of $CK_L$ (i.e., at voltage level $V_{L-}$) opens switch element 133 to decouple domain bridge 140 from the lower logic domain rail (VL−), thus precharging the domain bridge (including the gate capacitance of one or more output stage transistors) to $V_{IO+}$ (i.e., $V_{DB}$ is charged to $V_{IO+}$ as shown). During the ensuing drive interval 153, the high phase of $CK_{IO}$ (at voltage level $V_{IO+}$) opens switch element 131 to decouple domain bridge 140 from the upper IO domain rail, while the high phase of $CK_L$ closes switch element 133. The logic domain data signal ($D_L$) sets up during precharge interval 151, either opening or closing switch element 135 according to the state of data bit (0 or 1), and maintains the switch element state through the drive interval so that the bridging node (i.e., bridge 140) is either isolated at the $V_{IO+}$ precharge potential (switch element 135 open in response to $D_L=0$) or discharged to $V_{L-}$ (switch element 135 closed in response to $D_L=1$). In the discharge case, $V_{DB}$—the signal supplied to transistor gate(s) within output stage 130—transitions to a potential approximately 20 times greater (more negative) than the threshold voltage of output stage transistors, thus overdriving those transistors to yield a substantially (proportionally) larger output current than may be achieved by I/O-domain gate voltages. In the case of a CMOS output transistor, for example, the transistor output current $I_{DS}$ (drain-to-source current) for a gate-to-source voltage ($V_{GS}$) above the transistor threshold voltage (Vt) is first-order proportional to the gate overdrive voltage (i.e., $V_{GS}-V_t$) so that substantially higher output current (corresponding approximately to the ratio of the interdomain potential $|V_{IO+}-V_{L-}|$ to the intradomain potential $|V_{IO+}-V_{IO-}|$) is produced relative to that achieved when the same transistor gate is switched to $V_{IO-}$. Accordingly, on-chip or off-chip output signaling lines may be driven at potentially faster data rates than with conventional single-domain output drivers and/or higher-capacitance signal-line loading (e.g., higher fan-in or fan-out) may be tolerated without signaling-rate compromise—all without the increased output capacitance that plagues transistor geometry scaling approaches (i.e., increased transistor width/length ratio).

Figure 3:
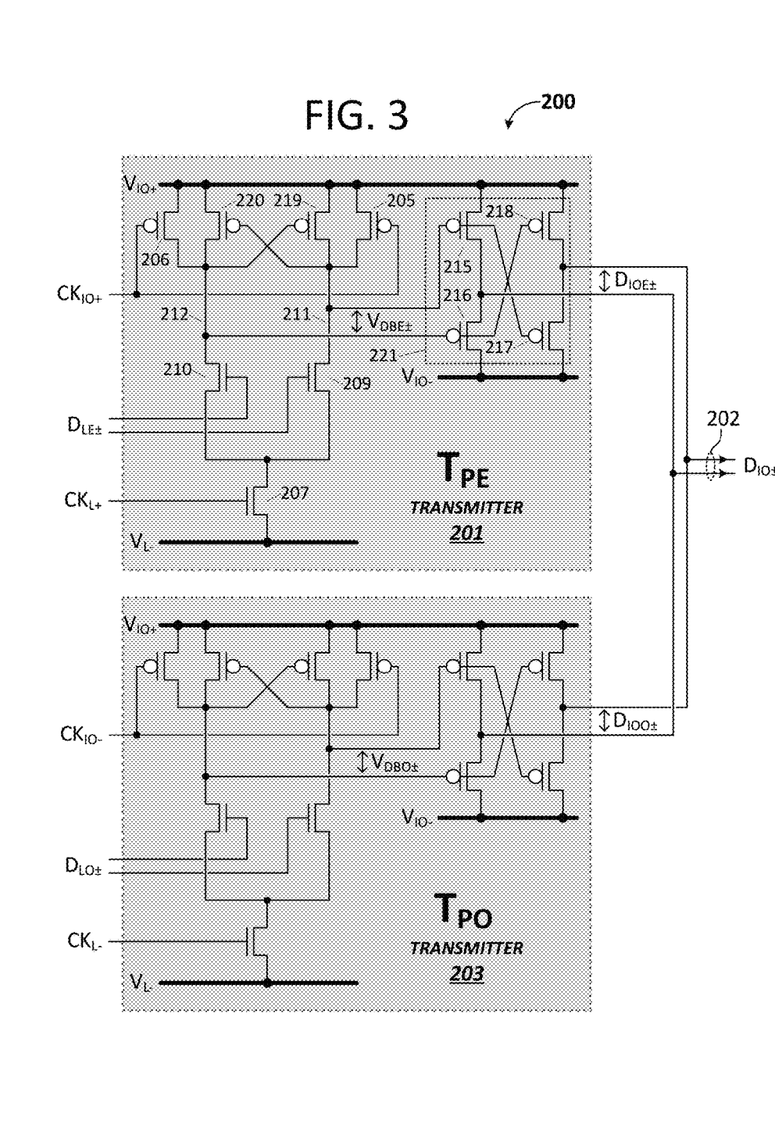
FIGS. 3 and 4 illustrate a more detailed embodiment of dual-domain transmitter 200 and corresponding operation/timing diagram.
Figure 4:
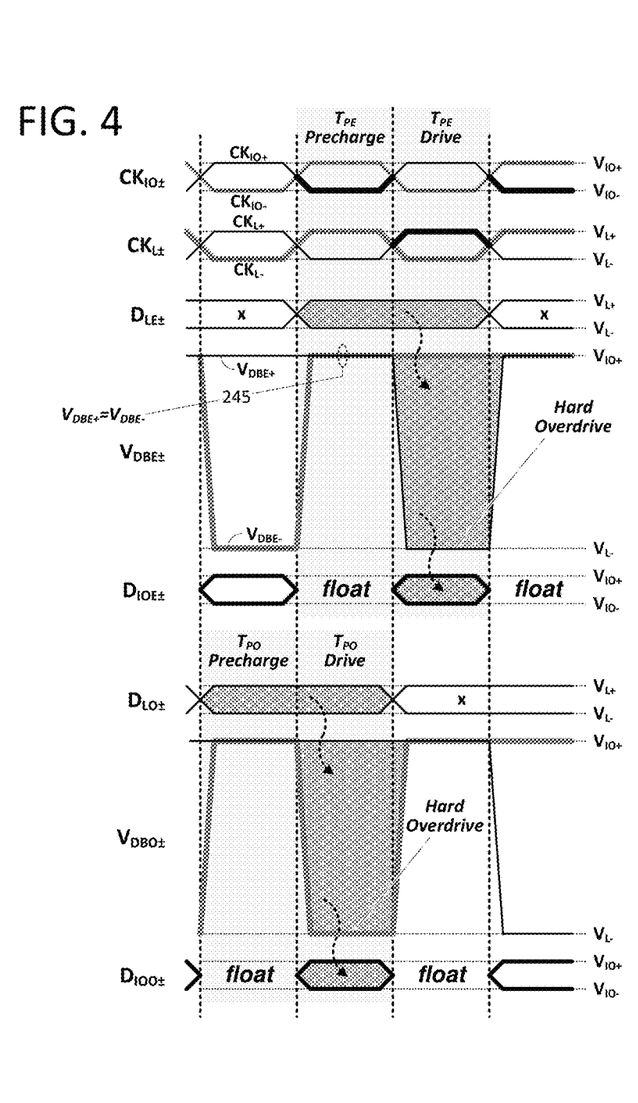

FIGS. 3 and 4 illustrate a more detailed embodiment of dual-domain transmitter 200 and corresponding operation/timing diagram. In the implementation shown, transmitter 200 includes even-phase and odd-phase component transmitters 201 and 203, respectively, that operate in pipelined precharge and output-drive intervals to drive IO-domain data signals onto differential output link 202 ($D_{IO\pm}$) in alternate half-clock cycles. That is, the precharge interval within the even-phase transmitter 201 transpires simultaneously with the output-drive interval of the odd-phase transmitter 203 and vice-versa.

In the FIG. 3 embodiment, the even-phase and odd-phase transmitters are implemented by identical transmit circuits, but clocked by complementary IO-domain and logic-domain clock signals. That is, the true and complement phases ($CK_{IO+}$ and $CK_{IO-}$) of a differential IO-domain clock signal $CK_{IO\pm}$ are supplied to the even and odd component transmitters 201 and 203, respectively, and true and complement phases ($CK_{L+}$ and $CK_{L-}$) of a logic-domain clock signal $CK_{L\pm}$ are likewise supplied respectively to those transmitters. Time-staggered even and odd logic-domain data signals $D_{LE}$ and $D_{LO}$, each conveyed differentially ($D_{LE\pm}$ and $D_{LO\pm}$), are supplied to respective differential amplifier stages of the even and odd transmitters synchronously with respect to the falling edge of the corresponding clock phase. More specifically, a new even-phase data bit becomes valid at the differential amplifier input (gates of transistors 209 and 210) of even-phase transmitter 201 at each falling edge of $CK_{L+}$, and a new odd-phase data bit becomes valid at the differential-amplifier input of odd-phase transmitter 203 at each falling edge of $CK_{L-}$, meaning that the even and odd input data bits each remain valid for a full clock cycle, but are phase offset from one another by 180° (i.e., a half-clock cycle). As shown, the IO-domain and logic-domain clocks are phase aligned and swing between approximately same potential, but are voltage-offset from one another according to the voltage offset between the IO and logic voltage domains.

Still referring to FIGS. 3 and 4 and specifically to even-phase transmitter 201, the low-going IO-domain clock phase ($CK_{IO+}$) and low-going logic-domain clock phase ($CK_{L+}$) commence a pre-charge interval within even-phase transmitter, switching on PMOS transistors 205 and 206 to couple true and complement nodes of a domain bridge (i.e., nodes 211 and 212 which constitute an output of the front-end differential amplifier of even-phase transmitter 201) to the upper IO domain voltage rail and thus precharge both nodes of the domain bridge to $VK_{IO+}$. During that same precharge interval (half clock-cycle), the low-going logic-domain clock phase ($CK_{L-}$) switches discharge transistor 207 to a non-conducting state and thus decouples the source terminals of input transistor pair 209/210 from the lower logic domain voltage rail ($V_{L-}$) so that, regardless of the even data bit state ($D_{LE}=1$ or $D_{LE}=0$), nodes 211 and 212 of the domain bridge remain decoupled from the $V_{L-}$ rail and thus remain pulled up (precharged) to $VK_{IO+}$ throughout the precharge interval. This result is depicted at 245 in FIG. 4, showing that both nodes 211 and 12 of the domain bridge are pulled to $V_{IO+}$ so that the differential voltage ($V_{DBE}$) is zero while the common mode between those two nodes is $V_{IO+}$. Each node 211, 212 of the domain bridge is coupled to gates of a respective pair of differential PMOS transistors within output stage 221 (i.e., node 211 is coupled to gates of output-stage transistors 215 and 217, while node 212 is coupled to gates of output-stage transistors 216 and 218) so that, throughout the precharge interval (i.e., while the domain-bridge nodes are precharged to VIO+), all output-stage transistors within the even-phase transmitter are rendered to an open-drain state, effectively decoupling the even-phase transmitter from differential signaling link 202 so that the link may be driven during that interval by odd-phase transmitter 203.

During the output-drive interval of even-phase transmitter 201 (i.e., the half clock cycle that follows the even-phase precharge interval), the high-going I/O clock signal switches off precharge transistors 205 and 206 (temporarily decoupling domain-bridge nodes 211 and 212 from $V_{IO+}$) while the high-going logic clock switches on discharge transistor

207. Depending on the Du bit state settled during the preceding precharge interval, one of input transistors 209 and 210 will be on (conducting) and the other off so that one of the domain bridge nodes 211 and 212 will correspondingly be discharged to VU (i.e., through the conducting input transistor and discharge transistor 207) while the other remains at or near $V_{IO+}$. Keeper transistors 219 and 220 are cross-coupled to domain-bridge nodes 212 and 211 so that the low-going domain-bridge node will switch on a keeper transistor coupled between $V_{IO+}$ and the other bridging node, thus effecting a positive feedback that maintains the non-discharged domain-bridge node at the $V_{IO+}$ rail potential while the other domain-bridge node is pulled to $V_{L-}$—in all, amplifying logic-level signal $D_{LE}$ by approximately an order of magnitude (in this example) to yield the inter-domain output-stage overdrive signal (i.e., having cross-domain potential $V_{IO+}-V_{L-}$) at the differential-amplifier output ($V_{DBE}$), the differential potential between nodes 211 and 212 of the domain bridge.

Still referring to FIGS. 3 and 4, the domain bridge node driven to $V_{IO+}$ maintains one pair of output-stage transistors (215/217 or 216/218) in a non-conducting (open-drain) state, while the domain bridge node driven to $V_{L-}$ switches on the other output-stage transistor pair to effect an IO-domain differential output on link 202, overdriving the gates of those transistors (gate-overdrive=$|V_{GS}-Vt|$) by roughly a factor of N relative to the gate-overdrive achievable using single-domain gate voltages, where N is the ratio of the inter-domain potential ($V_{IO+}-V_{L-}$) to the intradomain potential ($V_{IO+}-V_{IO-}$)—approximately 10× with the exemplary voltage domains shown in FIG. 1. This extreme gate over drive (i.e., "hard" turn on of output stage transistors) yields a substantially higher drain-to-source current ($I_{DS}$) than achievable using single-domain gate voltages, thus effecting more rapid output link slew (faster signaling) and/or supporting increased link loading (higher link capacitance) for a given output slew rate (i.e., higher fan-in or fan-out), all without increasing the voltage swing on the output data link relative to that at the data input (i.e., $D_{IOE\pm}$ still swings between $V_{IO+}$ and $V_{IO-}$ and thus exhibits a peak-to-peak amplitude nominally equal to that of input data bit $D_{LE\pm}$). Moreover, the cost of this increased output current is limited to amplified overdrive of a relatively small internal circuit capacitance—specifically, the six transistor gates coupled to nodes 211 and 212 of the domain bridge (i.e., gates of transistors 215-220) and the conductive interconnects to those gates.

In a number of embodiments, these benefits are leveraged to enable voltage-scaled circuit operation in exceedingly low temperature environments, including cryogenic environments generally under 100 K, and more specifically at or around the boiling point of liquid nitrogen (~77K) or even the boiling point of liquid helium (~4K). In embodiments targeted for operation in a ~4K environment, for example, the logic-domain voltage ($V_L=V_{DD}$) is scaled to approximately 10 mV (~100× lower than in a typical room temperature implementation) to yield a 2× gate overdrive of CMOS transistors having a ~5 mV threshold voltage; operating points that may reduce energy per operation by roughly 50× relative to execution of that same operation at room temperature. In such environments, increased transistor delay (first order inversely-proportional to VDD-Vt) may be counteracted at least within signal driving circuits using the domain-bridging approach shown in FIGS. 1-4, enabling data rates at least 2× and possibly higher than those achievable with conventional CMOS signaling circuits.

Odd-phase transmitter 203 operates in the same manner as even-phase transmitter 201, but with half-cycle-offset precharge and output-drive intervals effected by complement phases of the I/O and logic clocks ($CK_{IO-}$ and $CK_{L-}$). Thus, odd-phase transmitter drives odd-phase output data signal $D_{1OO\pm}$ onto link 202 (i.e., with logic-level swing level-shifted into the IO voltage domain) during the precharge phase of even-phase transmitter 201 and performs a domain-bridge precharge (effecting an open-drain/floating state of the odd-phase output stage) during the output-drive phase of even-phase transmitter 203.

Figure 5:
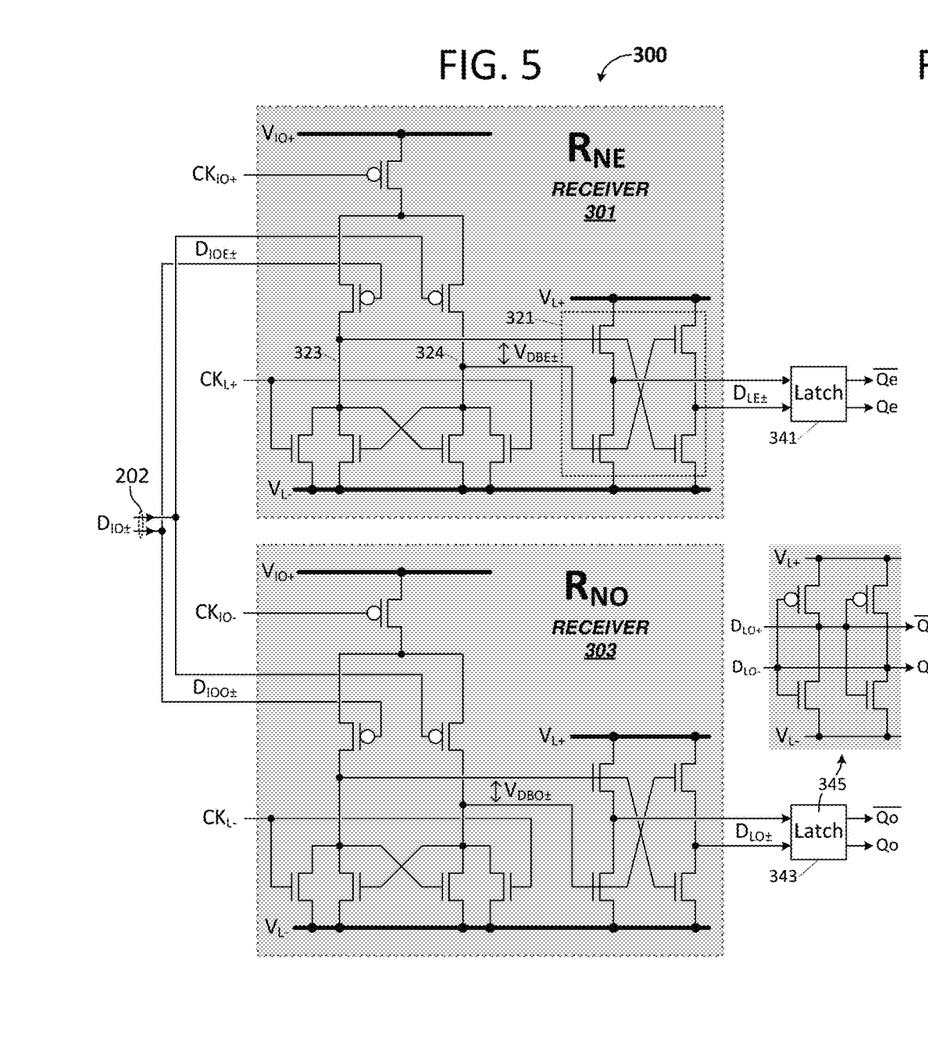
FIGS. 5 and 6 illustrate an embodiment and timing diagram of a dual-domain receiver counterpart to the dual-domain transmitter shown in FIG. 3.
Figure 6:
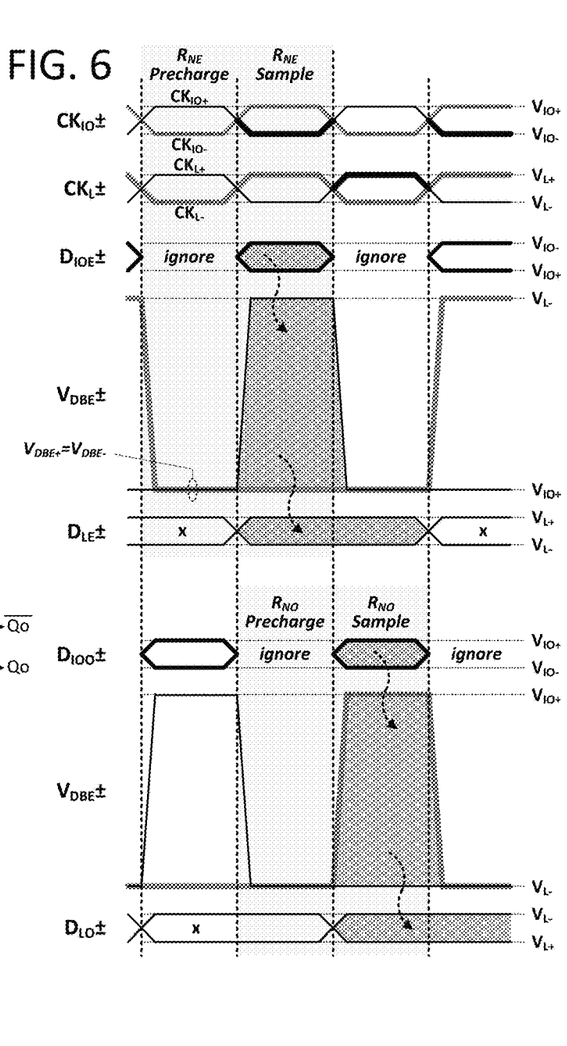

FIGS. 5 and 6 illustrate an embodiment and timing diagram of a dual-domain receiver 300; a counterpart to the dual-domain transmitter 200 shown in FIG. 3. Referring first to FIG. 5, dual domain receiver 300 includes even-phase and odd-phase component receivers 301 and 303 that synchronously sample an IO domain signal arriving at double-data-rate via link 202 (respective data bit in each half cycle of sampling clock) to produce time-staggered even and odd logic-domain data signals $D_{LE}$ and $D_{LO}$. As in the dual-domain transmitter, the even-phase and odd-phase components of receiver 300 are clocked by complementary instances of an I/O domain clock and logic clock ($CK_{IO\pm}$ and $CK_{L\pm}$) to implement pipelined precharge and sampling operations—the even-phase receiver precharging an internal domain bridge during the low-going phase of the domain and I/O clocks and then sampling the I/O link (i.e., generating an inter-domain potential across the nodes of the domain bridge in accordance with the conveyed data bit) to overdrive the gates of output stage transistors during a data sampling phase. The reverse voltage domain transition (from I/O domain to logic domain in contrast to logic-to-IO transition in the transmitter) is effected by opposite gate-polarity transistor configurations relative to those in the FIG. 3 transmitter (i.e., PMOS transistors in place of NMOS transistors and vice-versa), and with reverse voltage rail configurations (output stage 321 coupled between $V_{L+}$ and $V_{L-}$ instead of $V_{IO+}$ and $V_{IO-}$, and domain bridge nodes 323 and 324 precharged to $V_{L-}$ instead of $V_{IO+}$), but circuit operation is otherwise as described above with respect to the counterpart transmitter. In the embodiment shown, the logic-domain data sample from each of the even-phase and odd-phase transmitter components (i.e., $D_{LE}$ and $D_{LO}$) is captured within respective latch elements 341 and 343 (e.g., implemented by a back-to-back inverter circuit as shown at 345, though other latching elements may be used) which maintains the sample during the ensuing precharge interval of the subject receiver (i.e., while the receiver output floats).

The dual-domain transmitter and receiver circuits shown in FIGS. 3 and 5 may be combined on each side of a given signaling link to form a dual-domain transceiver pair (e.g., as shown in FIG. 1). Also, the "logic domain" and "I/O domain" nomenclature herein is somewhat arbitrary—any two or more supply voltage domains (e.g., upper/lower, top/bottom, input/output, etc.) may be employed to achieve a circuit-internal large signal swing (i.e., between one rail of a first domain and one rail of the other) while input and output signals are constrained to the smaller signal swings of their respective domains. Also, as discussed below, the CMOS circuits shown in FIGS. 3 and 5 may be inverted (including inversion of waveforms shown in FIGS. 4 and 6) in view of the underlying symmetry of constituent PMOS and NMOS transistors (e.g., swapping PMOS and NMOS devices as shown in FIG. 10).

Figure 7:
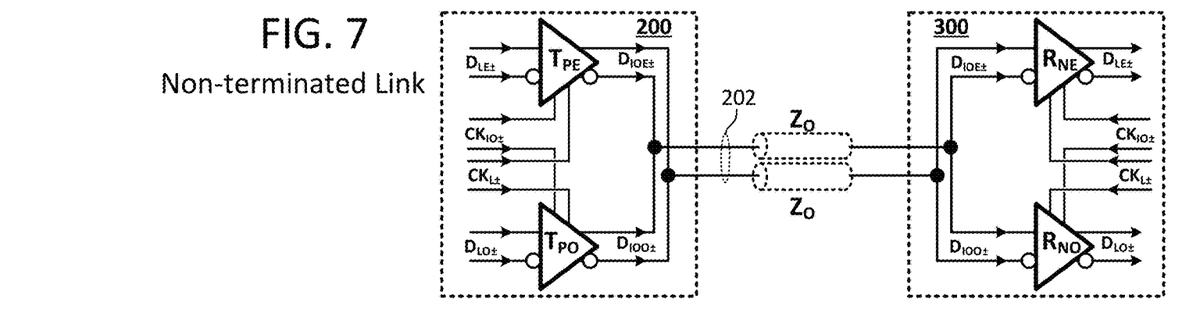
FIGS. 7, 8 and 9 illustrate alternative termination options that may be employed with respect to the signaling link coupled between the dual-domain transmitter and receiver circuits shown in FIGS. 3 and 5.
Figure 8:
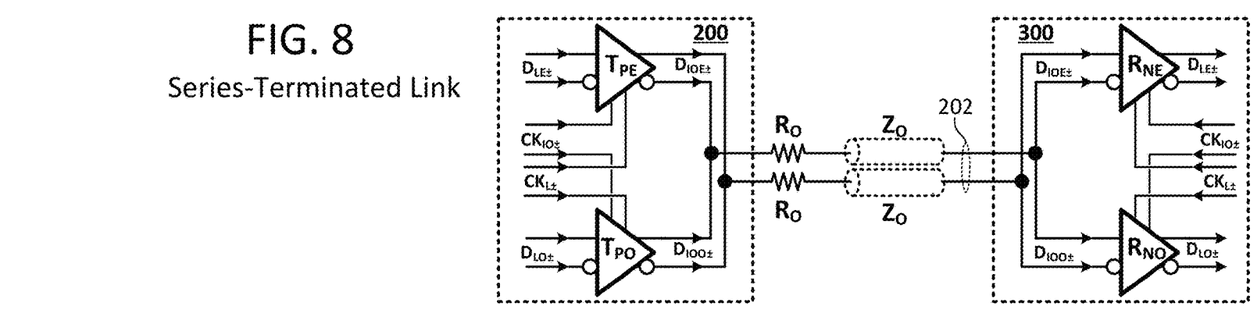
Figure 9:
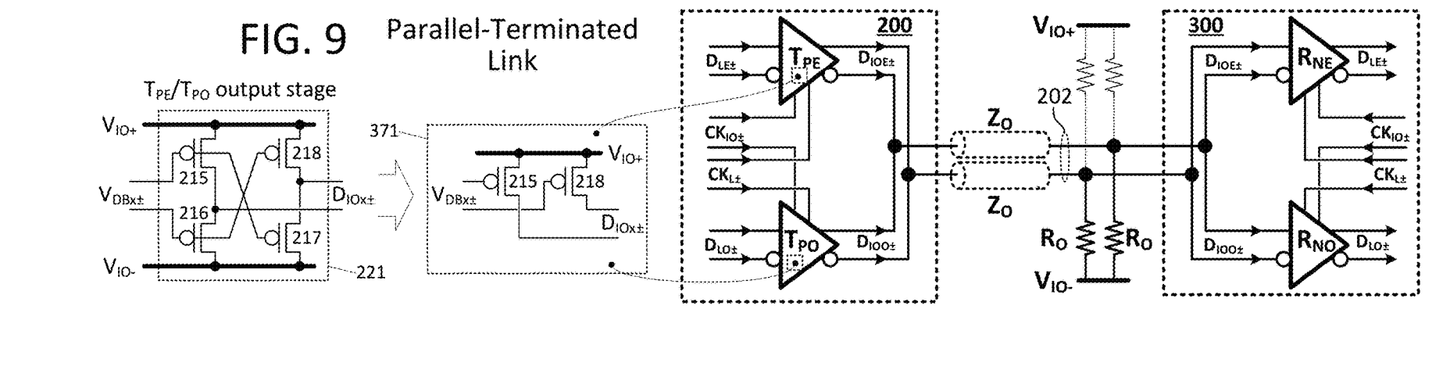

FIGS. 7, 8 and 9 illustrate various termination options that may be employed with respect to the signaling link 200 coupled between the dual-domain transmitter and receiver circuits (200, 300) shown in FIGS. 3 and 5. In the signaling arrangement of FIG. 7, signaling link 200 (a differential link having in which each component signal line has characteristic impedance $Z_O$) is unterminated—an arrangement that may be sufficient where signal propagation time over the link is substantially shorter than the bit interval or signal reflections are otherwise tolerable. In the FIG. 8 configuration, transmit-side termination elements ($R_O$) are implemented in series with respective component signal lines of link 200 to effect a series-stub termination. Though shown outside transmitter 200, the termination elements may be implemented in whole or part by the source impedance of signal transmitter 200 itself.

In the receiver-side termination arrangement of FIG. 9, termination elements ($R_O$) are coupled in parallel with dual-domain receiver 300 to respective signal lines of signaling link 200 to effect an impedance matching network that attenuates signal reflections at the receiver side of the link. As shown, the parallel termination elements may be coupled to either of the IO domain voltage rails ($V_{IO-}$ or $V_{IO+}$) and thus effect a link pull-down or pull-up that enables omission of transistors in the output stages of transmitter 200 otherwise needed to effect that signal link state. For example, when the link is receiver-side terminated to $V_{IO-}$ (i.e., respective termination element $R_O$ coupled between receiver-side of each component signal line and $V_{IO-}$), transmitter output stage transistors otherwise provided to drive the component signal lines of the link to $V_{IO-}$ (i.e., transistors 216 and 217 as shown in exemplary output stage 221) may be omitted from the transmitter output stage to yield the simplified output stage shown at 371 (i.e., having only output stage transistors 215 and 218 to drive the $V_{IO+}$ output state). Conversely, when the link is receiver-side terminated to $V_{IO+}$, output stage transistors 215 and 218 may be omitted so that each output stage includes only pull-down transistors 216 and 217.

Figure 10:
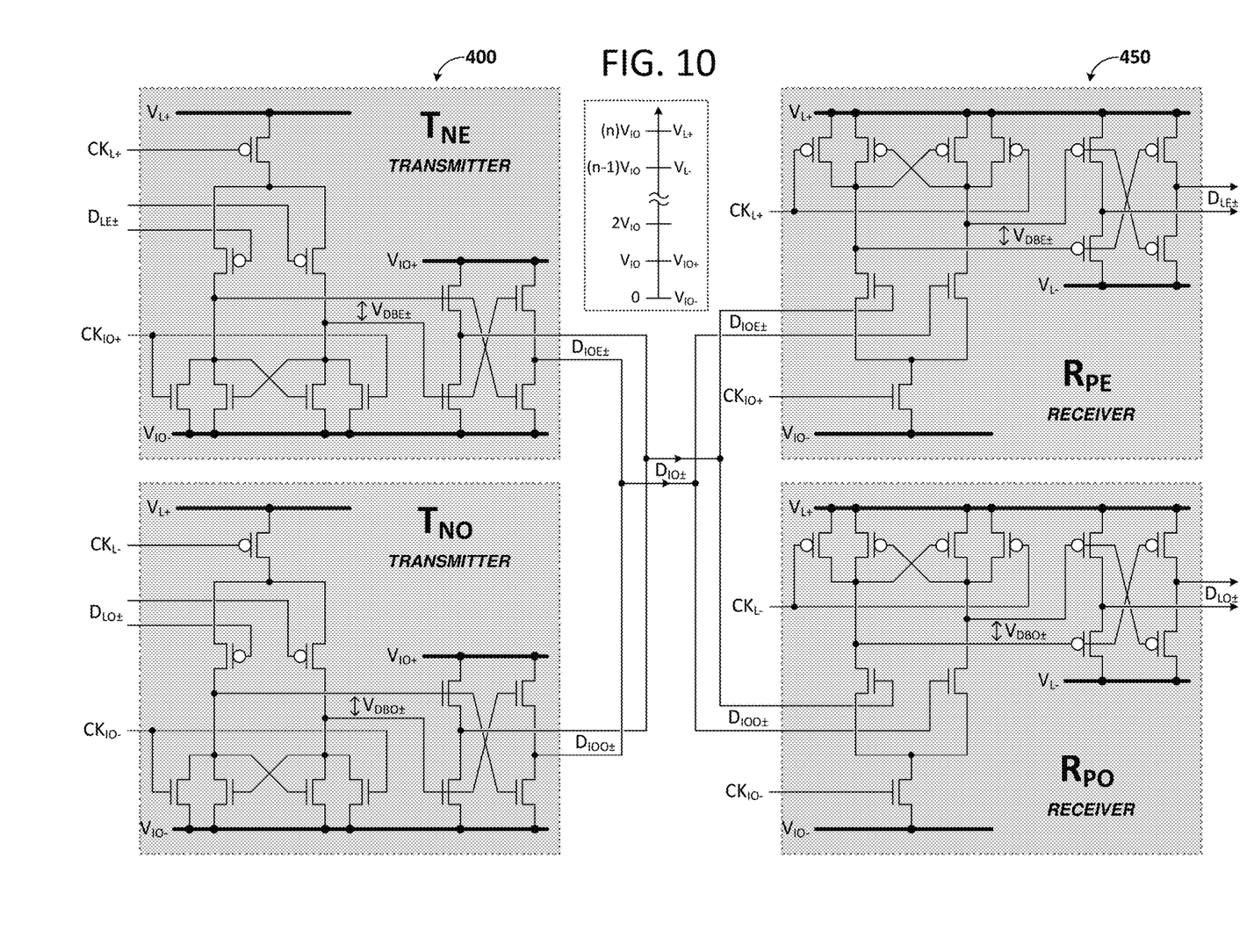
FIG. 10 illustrates alternative embodiments of dual-domain transmitter and receiver circuits in which the polarity of the voltage offset between the logic and I/O voltage domains is flipped relative to that shown in FIG. 1.

FIG. 10 illustrates alternative embodiments of dual-domain transmitter and receiver circuits, 400 and 450, in which the polarity of the voltage offset between the logic and I/O voltage domains is flipped relative to that shown in FIG. 1. That is, the logic voltage domain is implemented approximately an order of magnitude higher (other ratios or voltage offsets may apply as discussed above) than that of the I/O domain instead of an order of magnitude lower. Transmitter and receiver circuits (400, 450) are generally implemented and operated as discussed above in reference to FIGS. 3-6 (i.e., each of transmitter 400 and receiver 450 having even-phase and odd-phase components that operate in pipelined precharge and drive/sample intervals) with reversed transistor carrier-conductions and voltage-rail connections—that is, PMOS transistors are implemented in place of NMOS transistors and vice-versa (with respect to the FIGS. 3 and 5 embodiments). Where parallel receiver-side link terminations are provided to pull-up or down either component of the differential signaling link, transmitter output stage transistors provided to effect that link state may be omitted (i.e., generally as discussed in reference to FIG. 9).

Figure 11:
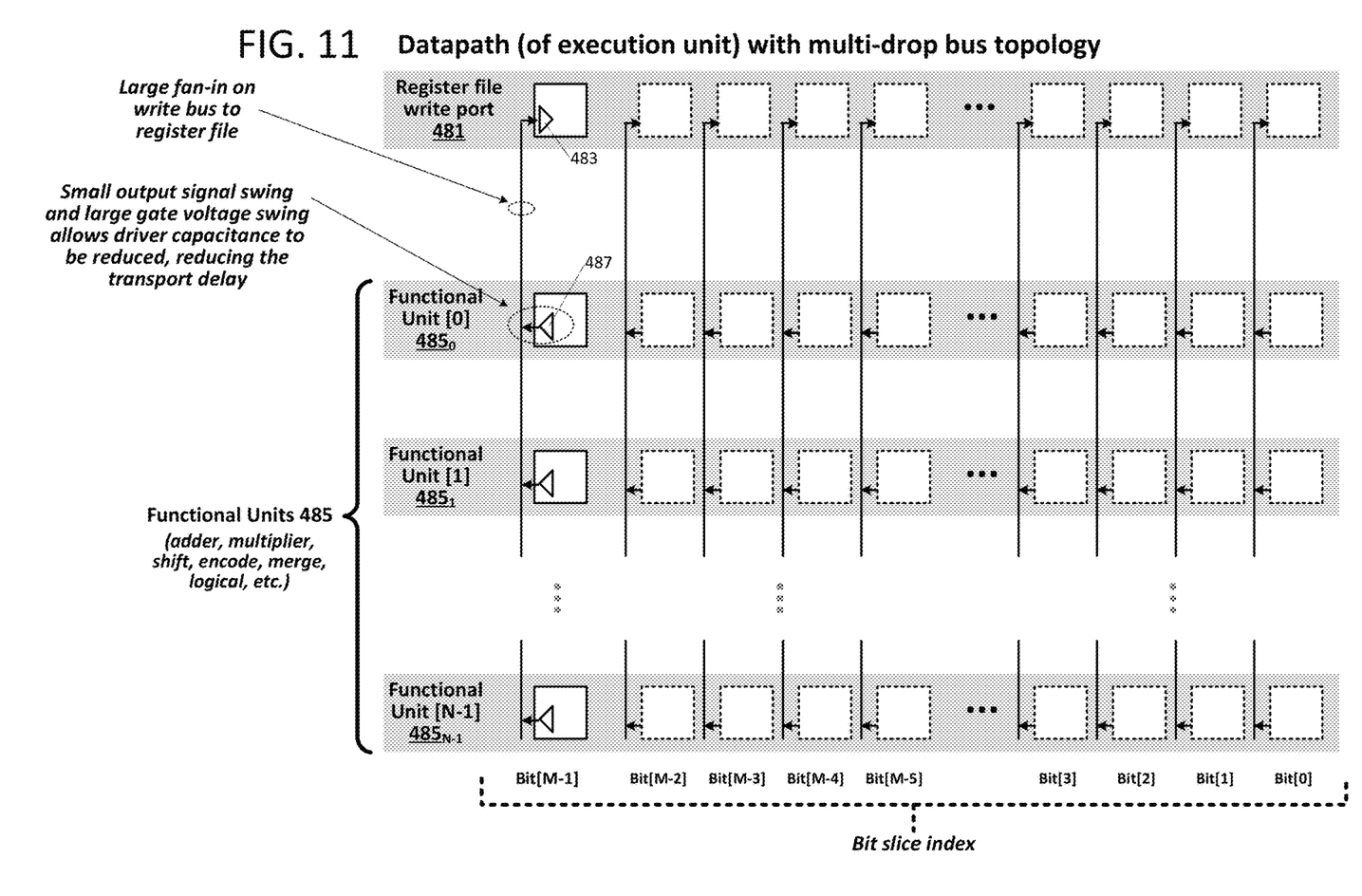
FIG. 11 illustrates an embodiment of an execution unit that leverages the dual-domain transmitter/receiver circuits discussed above to reduce data transport delay between constituent components.

FIG. 11 illustrates an embodiment of an execution unit that leverages the dual-domain transmitter/receiver circuits discussed above to reduce data transport delay between constituent components. More specifically, a register file 481 having per-bit dual-domain receiver circuits 483 is coupled to receive data signals from dual-domain transmitter circuits 487 within any of multiple functional units 485$_0$-485$_{N-1}$ (collectively, functional units 485). Referring to a single bit of the bit-sliced architecture (i.e., each of functional units 485 may transmit an M-bit value to register file 481 for storage therein), the relatively large gate-overdrive (e.g., ~20Vt) and small output signal swing (~2Vt) effected by the dual-domain transmitter within a given functional unit enables, relative to conventional transmit circuitry with comparable driver impedance, either substantially larger fan-in to the register-file write port (e.g., N to 1 in this example) and/or substantially faster data rate (reduced delay). As discussed above, the reduced transport delay (and/or increased fan-in) become particularly beneficial in voltage-scaled cryogenic systems, enabling pipelined data transport (e.g., even phase and odd phase) at data rates that compensate for the increased transistor delay at low temperature.

Figure 12:
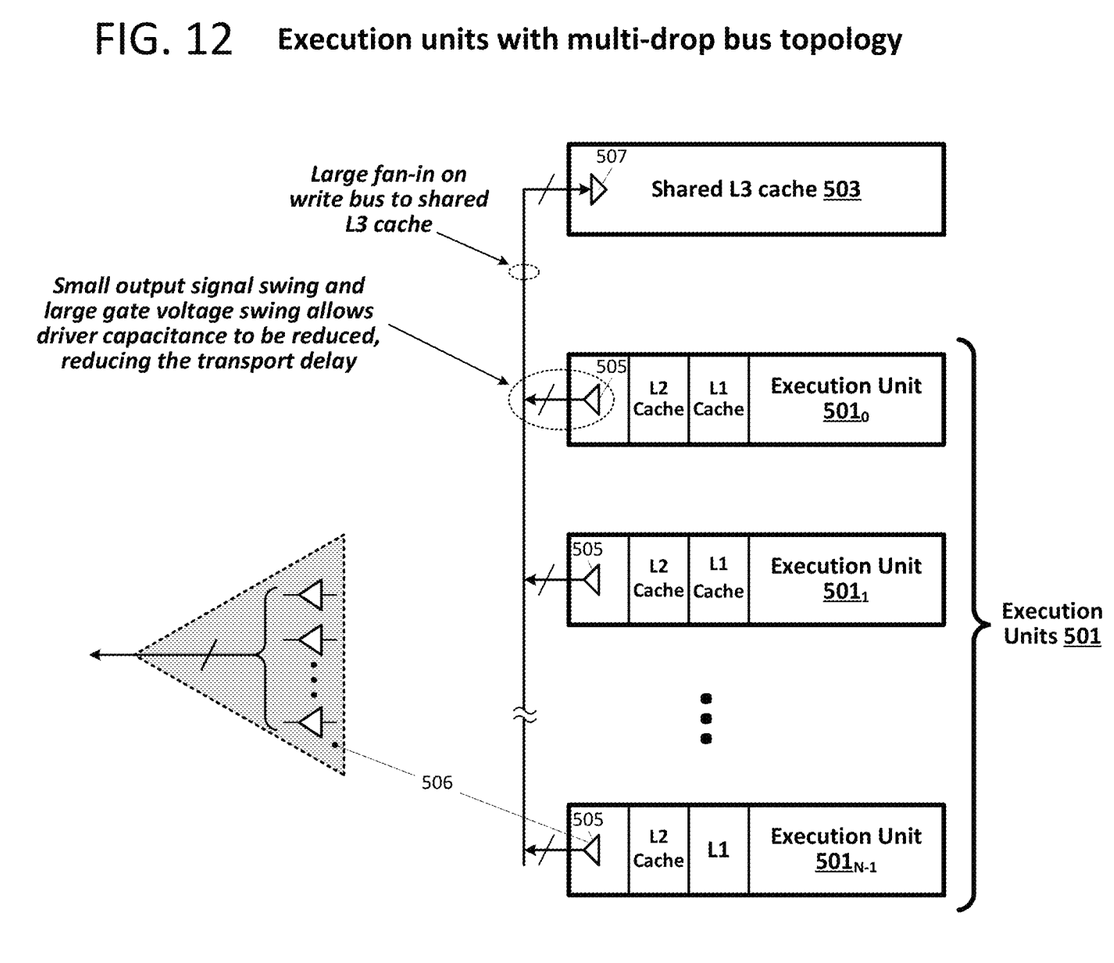
FIG. 12 illustrates an embodiment of a processor that leverages the dual-domain transmitter/receiver circuits discussed above to reduce transport delay and/or enable increased fan-in between constituent execution units and a shared cache.

FIG. 12 illustrates an embodiment of a processor that leverages the dual-domain transmitter/receiver circuits discussed above to reduce transport delay and/or enable increased fan-in between constituent execution units 501$_1$-501$_{N-1}$ (collectively 501) and a shared cache 503. In the particular embodiment shown, each of execution units 501 (which may incorporate respective/dedicated level-1 (L1) and level-2 (L2) memory caches) includes a set of dual-domain transmitters 505 (i.e., including a bank of bit-transmit circuits as shown at 506) to drive data values to corresponding dual-domain receivers 507 within shared cache 503 (a level-3 cache in this example) via a multi-drop data bus. As in the execution unit implementation of FIG. 11, the relatively large gate-overdrive (e.g., ~20Vt) and small output signal swing (~2Vt) effected by the dual-domain transmitters within a given execution unit enables substantially larger fan-in to the shared cache (more execution units) and/or reduced data transport delay, a particularly helpful result in speed-throttled cryogenic applications.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific voltages, temperatures, temperature ranges, supply voltages, threshold voltages, transistor types and the like can be different from those described above in alternative embodiments. The term "coupled" is used herein to express a direct connection as well as a connection through one or more intervening circuits or structures. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. A method of operation with an output signal driver of an integrated-circuit (IC) component, the method comprising:
    generating, in response to an input signal constrained to a first voltage range, a control signal at one of two voltage levels according to a data bit conveyed in the input signal, the two voltages levels defining upper and lower levels of a second voltage range larger than the first voltage range; and
    generating, on an output node, an output-drive signal constrained to a third voltage range smaller than the second voltage range by applying the control signal to gate terminals of first and second output transistors having source terminals coupled respectively to maximum and minimum voltages of the third voltage range and drain terminals coupled in common to the output node.

2. The method of claim 1 wherein the first and third voltage ranges are each at least partially overlapped by the second voltage range and do not overlap one another.

3. The method of claim 1 wherein the first and third voltage ranges are offset from one another by a voltage difference greater than a difference between maximum and minimum voltages of the first voltage range and greater than a difference between the maximum and minimum voltages of the third voltage range.

4. The method of claim 1 wherein the two voltage levels that define the upper and lower voltages of the second voltage range include (i) a first voltage level that constitutes either a maximum voltage or a minimum voltage of the first voltage range and (ii) a second voltage level that constitutes either the maximum voltage or the minimum voltage of the third voltage range.

5. The method of claim 1 wherein a difference between maximum and minimum voltages of the first voltage range is nominally equal to a difference between the maximum and minimum voltages of the third voltage range.

6. The method of claim 1 wherein at least one of the first and second output transistors has a threshold voltage less than a difference between maximum and minimum voltages of the first voltage range and less than a difference between the maximum and minimum voltages of the third voltage range.

7. The method of claim 6 wherein the difference between the maximum and minimum voltages of the first voltage range is at least twice the threshold voltage of the at least one of the first and second output transistors.

8. The method of claim 1 further comprising receiving a clock signal and wherein generating the control signal comprises precharging a control node of the output signal driver to one of the two voltage levels of the second voltage range during a first half cycle of the clock signal and, depending on the data bit conveyed in the input signal, either maintaining the control node at the precharged voltage during an ensuing half cycle of the clock signal or transitioning the control node to other of the two voltage levels of the second voltage range during the ensuing half cycle of the clock signal.

9. The method of claim 1 wherein applying the control signal to the gate terminals of the first and second output transistors having source terminals coupled respectively to maximum and minimum voltages of the third voltage range comprises generating, between the gate and source terminals of at least one of the first and second output transistors, a voltage that exceeds a difference between the maximum and minimum voltages of the third voltage range.

10. The method of claim 9 wherein a voltage difference between the upper and lower levels of the second voltage range exceeds a threshold voltage of the at least one of the first and second output transistors by at least a factor of eight.

11. The method of claim 1 wherein the input signal is a differential signal that swings between maximum and minimum voltage levels of the first voltage range, and the output drive signal is a differential signal that swings between the maximum and minimum voltage levels of the third voltage range.

12. An integrated-circuit output signal driver comprising:
    input stage circuitry to generate, in response to an input signal constrained to a first voltage range, a control signal at one of two voltage levels according to a data bit conveyed in the input signal, the two voltages levels defining maximum and minimum levels of a second voltage range larger than the first voltage range; and
    output stage circuitry to generate, on an output node, an output-drive signal constrained to a third voltage range smaller than the second voltage range, the output stage circuitry including first and second output transistors having gate terminals coupled in maximum and minimum voltages of the third voltage range and drain terminals coupled in common to the output node.

13. The integrated-circuit output signal driver of claim 12 wherein the first and third voltage ranges are each at least partially overlapped by the second voltage range and do not overlap one another.

14. The integrated-circuit output signal driver of claim 12 wherein the first and third voltage ranges are offset from one another by a voltage difference greater than a difference between maximum and minimum voltages of the first voltage range and greater than a difference between the maximum and minimum voltages of the third voltage range.

15. The integrated-circuit output signal driver of claim 12 wherein the two voltage levels that define the upper and lower voltages of the second voltage range include (i) a first voltage level that constitutes either a maximum or a minimum voltage of the first voltage range and (ii) a second voltage level that constitutes either the maximum voltage or the minimum voltage of the third voltage range.

16. The integrated-circuit output signal driver of claim 12 wherein a difference between maximum and minimum voltages of the first voltage range is nominally equal to a difference between the maximum and minimum voltages of the third voltage range.

17. The integrated-circuit output signal driver of claim 12 wherein at least one of the first and second output transistors has a threshold voltage less than a difference between maximum and minimum voltages of the first voltage range and less than a difference between the maximum and minimum voltages of the third voltage range.

18. The integrated-circuit output signal driver of claim 17 wherein the difference between the maximum and minimum voltages of the first voltage range is at least twice the threshold voltage of the at least one of the first and second output transistors.

19. The integrated-circuit output signal driver of claim 12 wherein the input stage circuitry comprises an input to receive a clock signal, a control node coupled to the gate terminals of the first and second output transistors, and control circuitry to generate the control signal on the control node, the control circuitry including circuitry to:
   precharge the control node to one of the two voltage levels of the second voltage range during a first half cycle of the clock signal; and
   depending on the data bit conveyed in the input signal, either maintain the control node at the precharged one of the two voltage levels of the second voltage range during an ensuing half cycle of the clock signal or transition the control node to other of the two voltage levels of the second voltage range during the ensuing half cycle of the clock signal.

20. The integrated-circuit output signal driver of claim 12 wherein receipt of the control signal on the gate terminals of the first and second output transistors produces, between the gate and source terminals of at least one of the first and second output transistors, a voltage that exceeds a difference between the maximum and minimum voltages of the third voltage range.

21. The integrated-circuit output signal driver of claim 20 wherein a voltage difference between the upper and lower levels of the second voltage range exceeds a threshold voltage of the at least one of the first and second output transistors by at least a factor of eight.

22. The integrated-circuit output signal driver of claim 12 wherein the input signal is differential signal that swings between maximum and minimum voltage levels of the first voltage range and the output drive signal is a differential signal that swings between the maximum and minimum voltage levels of the third voltage range.

23. An integrated-circuit output signal driver comprising:
   means for generating, in response to an input signal constrained to a first voltage range, a control signal at one of two voltage levels according to a data bit conveyed in the input signal, the two voltages levels defining upper and lower levels of a second voltage range larger than the first voltage range; and
   means for generating, on an output node, an output-drive signal constrained to a third voltage range smaller than the second voltage range by applying the control signal to gate terminals of first and second output transistors having source terminals coupled respectively to maximum and minimum voltages of the third voltage range and drain terminals coupled in common to the output node.

* * * * *